UNITED STATES PATENT OFFICE.

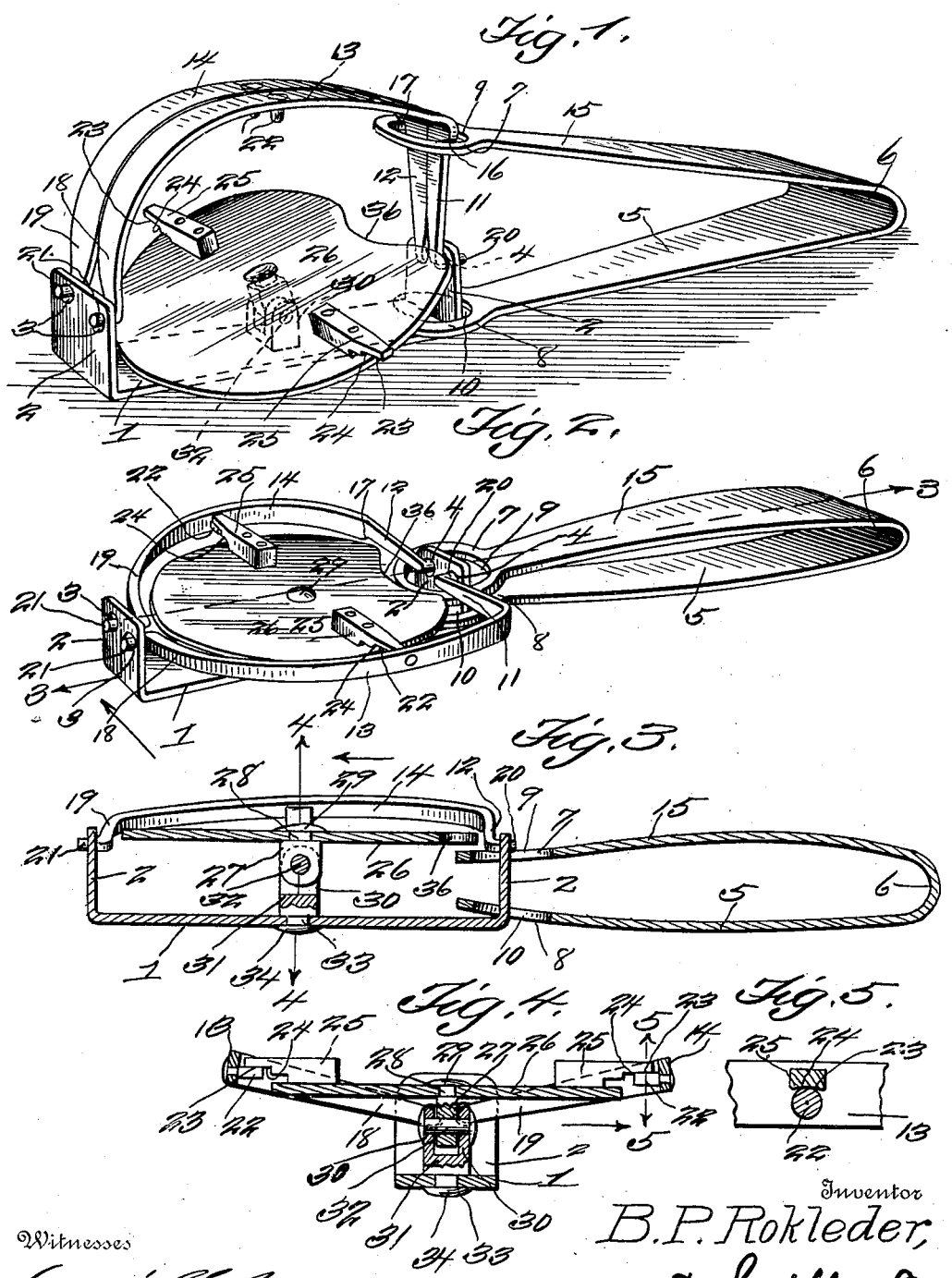

BEDO P. ROKLEDER, OF AU GRES, MICHIGAN.

ANIMAL-TRAP.

977,550.

Specification of Letters Patent.   Patented Dec. 6, 1910.

Application filed September 3, 1910.   Serial No. 580,430.

*To all whom it may concern:*

Be it known that I, BEDO P. ROKLEDER, a citizen of the United States, reisding at Au Gres, in the county of Arenac and State of Michigan, have invented a new and useful Animal-Trap; and I do hereby declare the following to be a full, clear, and exact description of the invention, such as will enable others skilled in the art to which it appertains to make and use the same.

This invention relates to animal traps, and particularly to a class known as "jaw traps," the object of the invention being to so construct and arrange an oscillatory plate having lugs, to engage projections of the jaws for holding them spread apart and downward against the tension of a leaf spring folded upon itself.

A further object of the invention is to so arrange the several parts, that when pressure is applied upon the oscillatory plate upon either side of its fulcrum, the jaws will be released from their set positions and brought together.

With these and other objects in view, the invention comprises other combination of features and parts which will be hereinafter set forth, shown in the drawings, and pointed out in the appended claims.

In the drawings:—Figure 1 is a perspective view of an animal trap embodying the features of the invention. Fig. 2 is a perspective view of the trap, showing the jaws set. Fig. 3 is a sectional view on line 3—3 of Fig. 2. Fig. 4 is a sectional view on line 4—4 of Fig. 3. Fig. 5 is sectional view on line 5—5 of Fig. 4, in order to show the slight curvature of the under face of the lugs carried by the oscillatory plate.

As to the accompanying drawings, 1 represents an elongated plate, having ears 2 at each end. These ears are provided with apertures 3 and 4.

5 represents a leaf spring, bent upon itself as at 6. The free ends of this spring are provided with annular members 7 and 8, which are provided with apertures 9 and 10. One of the ears 2 is extended through the aperture 10 of the annular member 8, as shown clearly in Fig. 1, while the arms 11 and 12 of the jaws 13 and 14 are received by the aperture 9 of the annular member 7, for instance, when the jaws 13 and 14 are in their closed positions, as in Fig. 1, but however, when the jaws are open, as in Fig. 2, the aperture 9 of the annular member 7 receives the ear 2, which is received by the aperture 10.

To prevent, or rather limit the upward movement of the parts 15 of the leaf spring, the arms 11 and 12 of the jaws are provided with shoulders 16 and 17, which are contacted with by the annular periphery of the annular member 7. The arms 11 and 12, and the arms 18 and 19, are provided with laterally extending lugs 20 and 21. The lugs 20 are received by the apertures 4, while the lugs 21 are received by the apertures 3. The jaws 13 and 14 are provided with projections 22, which engage the under curved surfaces 23 of the recessed portions 24 of the lugs 25, which are carried by the oscillatory plate 26. These lugs 25 extend transversely of the plate and the jaws, as shown in Figs. 1 and 2. By engaging the projections 22 with the under surfaces of the lugs 25, the jaws 13 and 14 are held in positions shown in Fig. 2, against the tension of the leaf spring. When these jaws are released, by applying pressure upon either side of the fulcrum of the plate 26, the leaf spring throws the jaws together, as in Fig. 1. In this manner an animal's foot, or any other part of him, placed upon the plate to one side or the other of its fulcrum, will be caught securely between the jaws.

The plate 26 is provided with a downwardly extending lug 27, which is provided with a restricted portion 28 riveted to the plate 26, as shown at 29. This lug 27 is fulcrumed between the ears 30 of the bifurcated lug 31, as shown at 32. This bifurcated lug 31 is provided with a reduced portion 33, which is riveted at 34 to the plate 1, approximately in the center of said plate. It will be clearly noted that by this structure the plate 26 is allowed to oscillate, in order to release the jaw. The plate 26 is provided with a cutaway portion 36, in order to permit the annular member 7 of the part 15 of the spring to pass the plate when depressed.

It will be noted that from the foregoing how animals may be trapped, it being clear that just so soon as an animal applies pressure upon the plate 26 to either side of its fulcrum, the jaws will be released, and brought together by the action of the leaf spring.

The invention having been set forth, what is claimed as new and useful is:—

1. In an animal trap, a base plate having an ear at each end thereof, said ears having apertures, semi-annular jaws pivoted in said apertures, a leaf spring bent upon itself having annular members at each end to receive one of the ears and two of the arms of the jaws, and an oscillatory plate having lugs for holding the jaws down and spread apart against the action of the springs, said jaws having extensions to engage the said lugs of the oscillatory plate, said oscillatory plate being adapted to be depressed upon either side of its fulcrum to release the jaws.

2. In an animal trap, an elongated base plate having an upstanding ear at each end, opposing pivoted jaws fulcrumed in said ears and provided with extensions, a spring bent upon itself and having its free end provided with annular rings to receive one of the ears and the adjacent arm of the jaws, and an oscillatory plate fulcrumed to the base plate and provided with lugs to engage said extensions to hold the jaws down and spread apart against the action of the spring, said plate being adapted to receive pressure upon each side of its fulcrum to release the jaws.

3. In an animal trap, an elongated base plate having an upstanding ear at each end thereof, said ears having apertures, jaws opposing one another and fulcrumed in said apertures, a leaf spring bent upon itself having apertured annular rings in registration with one another to receive one of the ears, and two of the adjacent arms of the jaws, said base plate having a bifurcated lug, an oscillatory plate having a lug fulcrumed in said bifurcated lug and provided with laterally extending lugs, said jaws having lateral extensions, said laterally extending lugs having slightly curved under surfaces to engage said lateral extensions to hold the jaws down and spread apart against the action of the leaf spring, said oscillatory plate adapted to receive pressure upon either side of its fulcrum to release the jaws, said adjacent arms of the jaws having shoulders to limit the upward movement of the upper portion of said leaf spring when bringing the jaws together, said oscillatory plate having a cutaway portion to allow free movement of the upper portion of said leaf spring.

In testimony whereof I have signed my name to this specification in the presence of two subscribing witnesses.

BEDO P. ROKLEDER.

Witnesses:
THEO. E. REICHLE,
CHARLES REICHLE.